(12) United States Patent
Sehrawat et al.

(10) Patent No.: US 11,308,081 B1
(45) Date of Patent: Apr. 19, 2022

(54) PRIVATE INFORMATION RETRIEVAL USING ONE QUERY TO PERFORM MULTIPLE RETRIEVALS

(71) Applicant: Seagate Technology LLC, Fremont, CA (US)

(72) Inventors: Vipin Singh Sehrawat, Singapore (SG); Foo Yee Yeo, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/127,127

(22) Filed: Dec. 18, 2020

(51) Int. Cl.
*G06F 16/24* (2019.01)
*G06F 16/242* (2019.01)
*G06F 16/2455* (2019.01)
*H04L 9/08* (2006.01)
*G06F 16/22* (2019.01)
*G06F 16/248* (2019.01)

(52) U.S. Cl.
CPC ........ *G06F 16/244* (2019.01); *G06F 16/2237* (2019.01); *G06F 16/248* (2019.01); *G06F 16/2455* (2019.01); *H04L 9/085* (2013.01)

(58) Field of Classification Search
CPC .............. G06F 16/244; G06F 16/2237; G06F 16/2455; G06F 16/248; H04L 9/085
USPC ....................................................... 707/769
See application file for complete search history.

(56) References Cited

U.S. PATENT DOCUMENTS

| 5,855,018 | A | 12/1998 | Chor et al. | |
|---|---|---|---|---|
| 6,523,026 | B1 * | 2/2003 | Gillis | G06F 16/3332 |
| 7,251,637 | B1 * | 7/2007 | Caid | G06K 9/4623 |
| | | | | 706/15 |
| 7,958,136 | B1 * | 6/2011 | Curtis | G06F 16/313 |
| | | | | 707/758 |
| 10,289,862 | B2 | 5/2019 | Augot et al. | |
| 10,402,579 | B2 | 9/2019 | Chow et al. | |
| 10,754,907 | B2 | 8/2020 | Sirdey et al. | |
| 2011/0191584 | A1 | 8/2011 | Trostle et al. | |
| 2016/0182222 | A1 * | 6/2016 | Rane | H04L 9/008 |
| | | | | 713/168 |
| 2019/0347256 | A1 * | 11/2019 | Wu | G06F 16/2272 |

OTHER PUBLICATIONS

Beimel et al., "Reducing the Servers Computation in Private Retrieval: PIR with Preprocessing", Journal of Cryptology 17(2), 19 pages.
Liu et al., "Towards Breaking the Exponential Barrier for General Secret Sharing", Annual Conference on the Theory and Applications of Cryptographic Techniques, Eurocrypt 2018, pp. 567-596.

* cited by examiner

*Primary Examiner* — Hicham Skhoun
(74) *Attorney, Agent, or Firm* — Mueting Raasch Group

(57) ABSTRACT

A method and apparatus for private information retrieval from a database, wherein the retrieval includes providing a covering vector for a plurality of database entries of the database. The covering vector is defined such that an inner product of the covering vector is zero with more than one member of a covering vector family that includes the covering vector. The retrieval includes generating database queries based on the covering vector and transmitting the database queries to at least two servers. An identical copy of the database may be stored on each of the at least two servers. Shares are received in response to the query, and these shares are aggregated, and a reconstruction algorithm executes to reconstruct the query results.

20 Claims, 4 Drawing Sheets

PRIVATE INFORMATION RETRIEVAL USING ONE QUERY TO PERFORM MULTIPLE RETRIEVALS

The present disclosure relates to private information retrieval (PIR), in which clients can privately retrieve database entries from a database.

SUMMARY

The present disclosure relates to private information retrieval (PIR), in which clients can privately retrieve database entries from a database. In one embodiment, a client computing system can configure private information retrieval by generating a covering vector for entries of the database to be searched/matched. The covering vector is defined such that an inner product of the covering vector is zero with more than one member of a covering vector family that includes the covering vector. The client computing system can then generate database queries using the covering vector, and transmit these queries to at least two servers, with each of these servers storing an identical copy of the database. In response to the queries, the servers will each provide a share of the queried database entries. The client computing system will then reconstruct the database entries based on the shares received from each server.

In an embodiment, a method for privately retrieving database entries from a database includes providing a covering vector for a plurality of database entries of the database. The covering vector is defined such that an inner product of the covering vector is zero with more than one member of a covering vector family that includes the covering vector. Database queries are generated based on the covering vector, and the database queries are transmitted to at least two servers. Shares are received responsive to transmitting the database queries. obtaining an aggregation of database entries based on the plurality of shares. An aggregation of database entries is then obtained based on the plurality of shares. In another embodiment, an apparatus for privately retrieving database entries from a database comprises a network interface and a computing apparatus comprising processing circuitry. The processing circuitry can provide a covering vector for a plurality of database entries of the database. The covering vector is defined such that an inner product of the covering vector is zero with more than one member of a covering vector family that includes the covering vector. The processing circuitry can generate database queries based on the covering vector and transmit the database queries to a plurality of servers over the network interface. The processing circuitry can then obtain an aggregation of database entries based on the plurality of shares.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
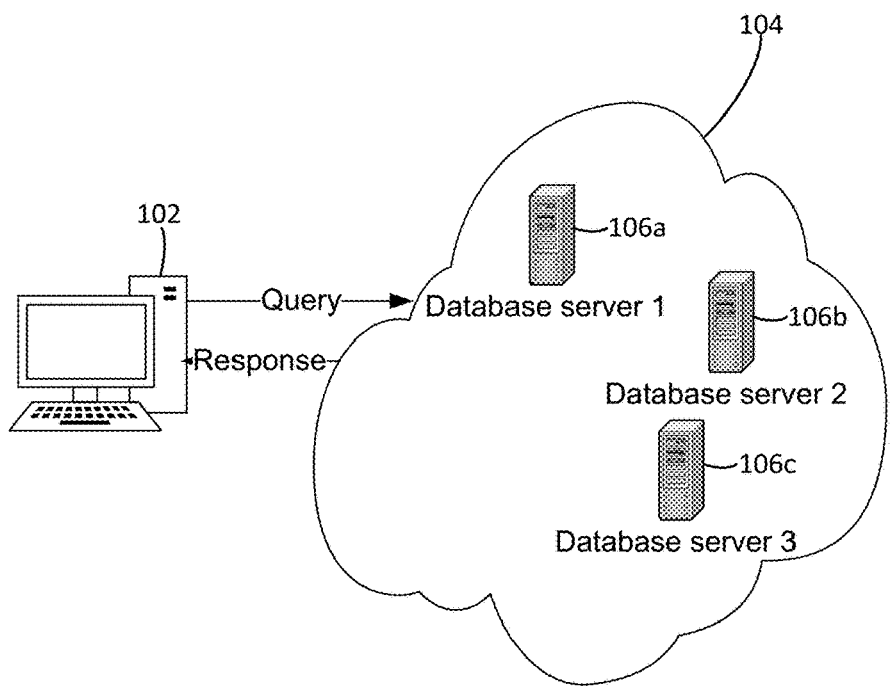
FIG. 1 illustrates an example of a system in which example embodiments can be implemented.

FIG. 1 illustrates an example of a system 100 in which example embodiments can be implemented. In FIG. 1, a client computer 102 provides encrypted queries to a group 104 of database servers, 106a, 106b, and 106c. The encrypted queries are generated according to an illustrative type of private information retrieval (PIR) method described later herein. The database servers 106a, 106b, 106c may each store an identical copy of the database being queried, and respond to the queries with answers, again according to illustrative PIR methods, and these are aggregated and reconstructed by the client computer 102 as described later herein.

PIR may be described as allowing a user application or computing device to search for and retrieve information from a database without revealing what is being retrieved. Formally, a PIR protocol takes place between a client, holding an index $i \in [n]$, where n is the set of natural numbers, and a database server, holding database $\mathcal{D}$. The PIR protocol allows the client to fetch the data $\mathcal{D}[i]$ from the database $\mathcal{D}$ while hiding the index i from the server. In some instances, several database servers (for example, t servers) can each hold identical copies of database $\mathcal{D}$. In other words, in the illustrative PIR described herein, what is being requested, which may be identified by an index, may be hidden from the database servers as well as any other computer system besides the client (i.e., the requesting computer system).

A t-server PIR protocol includes three algorithms $\mathcal{P} = (\mathcal{Q}, \mathcal{A}, \mathcal{R})$ that operate by first randomly sampling i and invoking a randomized query generation algorithm $\mathcal{Q}$ (t, n; i) to generate a t-tuple of queries $(q_1, \ldots, q_t)$. For $j \in [t]$, query $q_j$ is also denoted by $\mathcal{Q}_j(t, n; i)$. Second, for $j \in [t]$, a user (e.g., client computer 102 (FIG. 1) or component thereof) transmits query $q_j$ to server $S_j$, which responds with an answer $a_j = \mathcal{A}(t, j, \mathcal{D}, q_j)$ of some fixed length. Finally, the user (e.g., client computer 102 (FIG. 1) or component thereof) applies a reconstruction algorithm to compute R(t, n; i, $a_1, \ldots, a_t$). The reconstruction algorithm may be applied such that perfect privacy and perfect correctness conditions are satisfied. Perfect privacy requires that for all t, n and $i_1$, $i_2 \in [n]$, it holds that the distributions $\mathcal{Q}$ (t, n; $i_1$) and $\mathcal{Q}$ (t, n; $i_2$) are identical for all servers $S_j \sim (j \in [t])$. Perfect correctness requires that, for all t, n and $i \in [n]$, it holds that Pr[$\mathcal{R}$ (t, n; i, $a_1, \ldots, a_t$) = $\mathcal{D}[i]$] = 1.

For PIR protocols, communication overhead is given by the retrieval rate, which may be defined as the number of information bits that can be retrieved per bit of data received from the servers. The maximum value of the retrieval rate of a PIR protocol is referred to as its capacity, and the problem of characterizing capacity is important in PIR settings. The maximum capacity of any PIR protocol may be defined as $$C = \left(1 + \frac{1}{t} + \frac{1}{t^2} + \ldots + \frac{1}{t^{n-1}}\right)^{-1}.$$

PIR has many privacy-preserving applications, such as private messaging, certificate transparency, private media browsing, online anonymity, privacy preserving ad targeting, and more. However, despite the large number of applications in which PIR could be used, there have been essentially no large-scale deployments of PIR technology to date. A primary reason is that while modern PIR protocols have very small communication requirements—as small as polylogarithmic in the database size—the computational burden such modern PIR protocols put on the server is still prohibitively expensive. In particular, the work that the servers are required to perform may grow linearly with the database size when using modern PIR protocols because, e.g., the servers may essentially take a linear scan over the entire database to respond to each query. This limitation is inherent; even in the multi-server setting described briefly above, every secure PIR scheme on a database with index length n must incur $\Omega(n)$ total server-side work.

The $\Omega(n)$ server-side cost is the central bottleneck for PIR schemes in theory and practice, since all other costs in today's PIR protocols (communication, client time, etc.) are sublinear, or even polylogarithmic, in the database size. Existing efficient PIR schemes also rely on expensive preprocessing procedures.

Apparatuses and methods according to various embodiments can help remedy these and other problems by providing a secure distributed PIR scheme that allows simultaneous searching/retrieving of multiple indices/keywords via a single query. By providing such a simultaneous search, server-side work is reduced. For instance, if the client can perform PIR on k indices/keywords via a single query, then the server-side work reduces to $\Omega(n/k)$. Furthermore, the PIR scheme according to embodiments is unconditionally secure (i.e., the PIR scheme of embodiments information-theoretically secure), which means that the scheme is post-quantum secure by default since security guarantees do not depend on computational assumptions.

The PIR scheme described below utilizes vector families, referred to herein as "t-decomposable multi-matching vector families," to generate queries that can be run simultaneously to simultaneously retrieve multiple search results with little or no preprocessing necessary on the server side. The PIR scheme used in systems, methods, and apparatus according to various embodiments will be referred to hereinafter as a decomposable aggregate private information retrieval (APIR) scheme.

Decomposable APIR will now be defined, for the purpose of aiding in understanding example embodiments. A t-server decomposable APIR protocol allows a client computer 102 with input $x=(x_1, \ldots, x_{t-1}) \in [N]^{t-1}$ to query t servers, each holding a copy of a database $\mathcal{D}$ such that $|\mathcal{D}|=N^{t-1}$, and retrieve $\Sigma_{i \in f(x)} \mathcal{D}[i]$, for a function $f(x)$ that defines one-to-many mapping from $[N]^{t-1}$ to $[N]^{t-1}$. The procedure does not leak non-negligible information about x to any subset of servers with cardinality at most t−1.

In contrast to PIR, described earlier, a t-server decomposable APIR protocol $\mathcal{P}=(\mathcal{Q}, \mathcal{A}, \mathcal{R})$ for a database $\mathcal{D}$ such that $|\mathcal{D}|=N^{t-1}$ includes three algorithms, with the reconstruction algorithm being replaced with an aggregation algorithm R. At the beginning of the protocol, the user computer 102 has one or more inputs of the form $x=(x_1, \ldots, x_{t-1}) \in [N]^{t-1}$. Using its private randomness $r \in \{0, 1\}^{\gamma(N)}$, the client computer 102 computes a tuple of queries $(q_1, \ldots, q_t)=\mathcal{Q}(t, r, x)$, where each $q_i \in \{0, 1\}^{\alpha(N)}$.

The client computer 102 then sends the query $q_j$ to server $S_j$ for every $j \in [t]$. By way of illustration, referring to FIG. 1, the client computer 102 sends the query to each of the database servers 106a, 106b, 106c. Each server $S_j$ responds with an answer $a_j=\mathcal{A}(t, j, \mathcal{D}, q_j)$, with $a_j \in \{0, 1\}^{\beta(N)}$. Finally, the client computer 102 applies the reconstruction (or aggregation) algorithm $\mathcal{R}(x, r, a_1, \ldots, a_t)$ to compute the output $E_{i \in f(x)} \mathcal{D}[i]$, where $f$ defines a one-to-many mapping from $[N]^{t-1}$ to $[N]^{t-1}$.

The query generation algorithm $\mathcal{Q}$ and the reconstruction (or aggregation) algorithm $\mathcal{R}$ satisfy at least two decomposability properties. First, $\mathcal{Q}$ can be decomposed into t algorithms $\mathcal{Q}_1, \ldots \mathcal{Q}_{t-1}, \mathcal{Q}=(\mathcal{Q}_t^1, \ldots \mathcal{Q}_t^{t-1})$ such that for every input $x=(x_1, \ldots, x_{t-1}) \in [N]^{t-1}$, and for every random string $r \in \{0, 1\}^{\gamma(N)}$, the queries $(q_1, \ldots, q_t)=\mathcal{Q}(t, r, x)$ are computed by the client as $q_j=\mathcal{Q}_j(t, r, x_j)$ for $j \in [t-1]$ and $q_t=(q_t^1, \ldots, q_t^{t-1})=(\mathcal{Q}_t^1, \ldots, \mathcal{Q}_t^{t-1}(x_{t-1}))$.

With respect to the reconstruction (or aggregation) algorithm $\mathcal{R}$, there exist algorithms $\mathcal{R}', \mathcal{R}''$ such that for every input $x=(x_1, \ldots, x_{t-1}) \in [N]^{t-1}$ and for every random string $r \in \{0, 1\}^{\gamma(N)}$, if $(q_1, \ldots, q_t)=\mathcal{Q}(t, r, x)$ and $a_j=(t, j, \mathcal{D}, q_j)$ for $j \in [t]$, then the output of the reconstruction or aggregation algorithm $\mathcal{R}(x, r, a_1, \ldots, a_t)$ equals $\mathcal{R}''(a_t, \mathcal{R}'(x, r, a_1, \ldots, a_{t-1}))$ such that correctness and privacy requirements hold. With respect to correctness, the client always outputs the correct value of $\Sigma_{i \in f(x)} \mathcal{D}[i]$. Formally, for every input $x \in [N]^{t-1}$, and every random string r if $(q_1, \ldots, q_t)=\mathcal{Q}(t, r, x)$ and $a_j=A(t, j, \mathcal{D}, q_j)$ for $j \in [t]$, then $R(x, r, a_1, \ldots, a_t)=\Sigma_{i \in f(x)} \mathcal{D}[i]$. With respect to privacy, the answer of server $S_t$ and $\mathcal{R}'(x, r, a_1, \ldots, a_{t-1})$ do not disclose information not implied by $\Sigma_{i \in f(x)} \mathcal{D}[i]$. Formally, for every two inputs $x, x' \in [N]^{t-1}$ such that $\Sigma_{i \in f(x)} \mathcal{D}[i]=\Sigma_{i \in f(x')} \mathcal{D}[i]$. Let $a_j=\mathcal{A}(t, j, \mathcal{D}, \mathcal{Q}_j(t, r, x))$ and $a'_j=\mathcal{A}(t, j, D, \mathcal{Q}_j(t, r, x'))$ then for all q, b and all $j \in [t-1]$ with $q_t=\mathcal{Q}_t(t, r, x), q'_t=\mathcal{Q}_t(t, r, x')$, it holds that $Pr_r[q_t=q \wedge \mathcal{R}'(x, r, a_1, \ldots, a_{t-1})=b]=Pr[q'_t=q \wedge \mathcal{R}'(x', r, a'_1, \ldots, a'_{t-1})=b]$, where the probability is taken over a uniform choice of the random string r.

The complexity of the APIR protocol is the total number of bits communicated between the client and the t servers: $\Sigma_j(|q_j|+|a_j|)=t(\alpha(N)+\beta(N))$. The decomposable APIR is used to perform queries according to methods described below.

Figure 2:
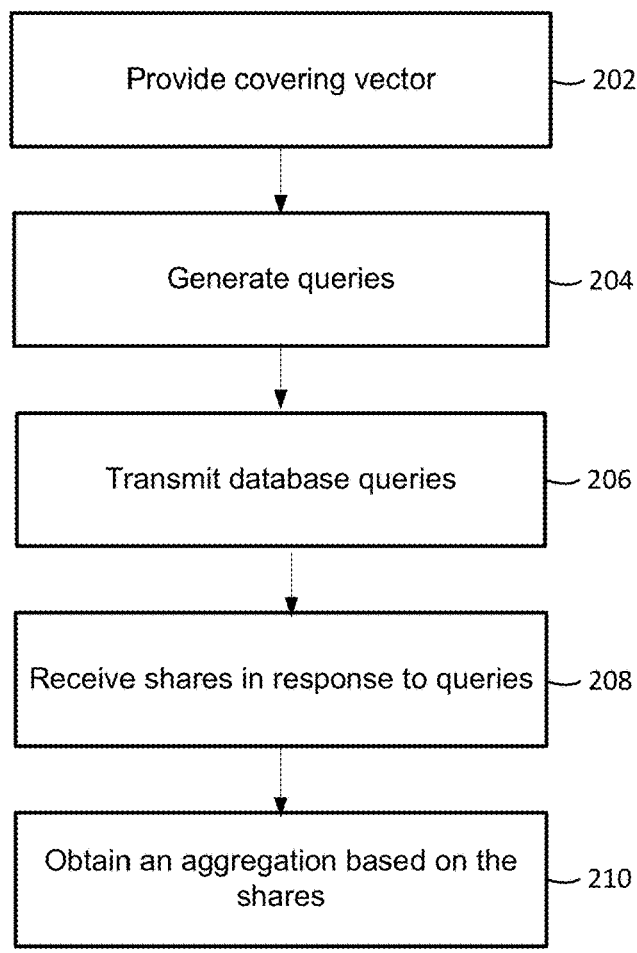
FIG. 2 is a flowchart illustrating an example method for private information retrieval in accordance with example embodiments.

FIG. 2 is a flowchart illustrating an example method 200 for private information retrieval in accordance with example embodiments. Some operations of method 200 can be implemented by components of the client computer 102 (FIG. 1), for example by processor 402 (FIG. 4) executing computer instructions 422, etc. The method can include operations of the decomposable APIR although embodiments are not limited thereto.

Example method 200 can begin with operation 202 with the processor 402 providing a covering vector. A covering vector is provided for database entries of a database, and identical copies of this database can be stored on two or more of database servers 106a, 106b, and 106c (FIG. 1). A covering vector is defined such that that an inner product of the covering vector is zero with more than one member of a covering vector family that includes the covering vector. Explanation of the covering vectors is provided below.

First, to understand the concept of covering vectors according to some embodiments, it is important to understand some fundamentals of set theory that apply to embodiments. Extremal set theory is a field of set theory that deals with determining or estimating the size of set-systems satisfying certain restrictions. Embodiments are related to a subfield of extremal set theory, called intersection theorems, wherein set-systems under certain intersection restrictions are constructed and bounds on the set sizes are derived. A uniform set system is defined:

Let $$m = \prod_{i=1}^{r} p_i^{\alpha_i}$$

be a positive integer with r>1 different prime divisors. Then there exists an explicitly constructible polynomial Q with n variables and degree $O(n^{1/r})$, which is equal to 0 on z=(1, 1, . . . , 1)∈{0, 1}$^n$ but is nonzero mod m on all other z∈{0, 1}$^n$. Furthermore, ∀z∈{0, 1}$^n$ and ∀i∈{1, . . . , r}, it holds that Q(z)∈{0, 1} mod $p_i^{\alpha_i}$.

Lemma 1

Then, there exists c=c(m)>0 such that for ever integer h>0, there exists an explicitly constructible uniform (all member sets have equal size) set-system $\mathcal{H}$ over a universe of h such that
1. $|\mathcal{H}| \geq \exp(c(\log h)^r/(\log \log h)^{r-1})$,
2. ∀H∈$\mathcal{H}$ :|H|=0 mod m, and
3. ∀G, H∈$\mathcal{H}$, G≠H:|G∩H|≠0 mod m Theorem 1—Constructible Uniform Set-System A matching vector family is a combinatorial object that is defined according to Definition 1:
Let S⊆$Z_m$\{0}, and (•, •) denote the inner product. Subsets $\mathcal{U} = \{u_i\}_{i=1}^N$ and V={$v_i$}$_{i=1}^N$ of vectors in $(Z_m)^h$ form an S-matching family if the following two conditions are satisfied: 1.) ∀i∈[N], it holds that ($u_i$, $v_i$)=0 mod m and 2.) ∀i, j∈[N] such that i≠j, it holds that: ($u_i$, $v_1$) mod m∈S.

Definition 1—Matching Vector Family

The question of bounding the size of matching vector families is closely related to the Extremal set theory problem of constructing set system with restricted modular intersections. Matching vectors have found applications in the context of private information retrieval, conditional disclosure of secrets, secret sharing, and coding theory. The first super-polynomial size matching vector family follows from Theorem 1 above. If each set H in the set system $\mathcal{H}$ defined by Theorem 1 is represented by a vector u∈$(Z_m)^h$, then an S-matching family of vectors can be defined according to Corollary 1:
Let h, m>0, and suppose that $$m = \prod_{i=1}^{r} p_i^{\alpha_i}$$

has r>1 different prime divisors. Then, there exists a set S of size $2^r-1$ and a family of S-matching vectors $\{u_i\}_{i=1}^N$ ∈$(Z_m)^h$, such that $$N \geq \exp\left(c\frac{(\log h)^r}{(\log \log h)^{r-1}}\right)$$

Corollary 1—S-Matching Vectors

Let S⊆$Z_m$\{0}. We say that $\mathcal{U}^{(1)} = \{u_{x_1}^{(1)}\}_{x_1 \in [N]}$, $\mathcal{U}^{(2)} = \{u_{x_2}^{(2)}\}_{x_2 \in [N]}$ and $\mathcal{V} = \{v_x\}_{x \in [N] \times [N]}$ in $Z_m^h$ form a decomposable S-matching vectors family of size $N^2$ if the following conditions hold:
1.) $\langle u_{x_1}^{(1)} + u_{x_2}^{(2)}, v_x \rangle = 0$ mod m for all x=($x_1$, $x_2$)∈[N]× [N] and 2.) $\langle u_{x_1}^{(1)} + u_{x_2}^{(2)}, v_x \rangle \in S$ for every x≠($x_1$, $x_2$).

Definition 2—Decomposable Matching Vectors Family

Hereinafter, a matching vector family $\{u_i, v_i\}_{i=1}^N$, will be referred to as an (N, l)-matching vector family, where l is the dimension of vectors $u_i$, $v_i$ (1≤i≤N). Covering vectors are now defined. First, let m, h>0 be positive integers, S⊆$Z_m$\{0} and w(•) and <•, •> denote Hamming weight and inner product, respectively.
A subset V=$v_{i=1}^N$ of vectors in $(Z_m)_h$ forms an S-covering family of vectors if the following two conditions are satisfied:
∀i∈[N], it holds that ($v_i$, $v_i$)=0 mod m,
∀i, j∈[N], where i≠j, it holds that:
($v_i$, $v_j$) mod m=0 if w($v_i$ ° $v_j$ mod m)=0 mod m and
($v_1$, $v_j$) mod m=∈S otherwise,
where ° denotes a Hadamard product, where a Hadamard product of two vectors u, v∈$\mathcal{R}^n$, denoted by u ° v, returns a vector in the same linear space whose i-th element is defined as: (u ° v)[i]=u[i]·v[i] for all i∈[n]

Definition 3—Covering Vector Family

A family of sets {$G_1$, $G_2$, . . . , $G_t$} is non-degenerate if for all 1≤i, j≤t (i≠j) it holds that $G_i$ is not a subset of $G_j$. (Definition 4). Let m≥2, t≥2 be integers and $\mathcal{H}$ be a set-system. $\mathcal{H}$ has t-wise restricted intersections modulo m if the following two conditions hold: 1.) ∀H∈$\mathcal{H}$, |H|=0 mod m, and 2.) ∀t' satisfying 2≤t'≤t and ∀$H_1$, $H_2$, . . . , $H_{t'}$∈ $\mathcal{H}$ with {$H_1$, $H_2$, . . . , $H_{t'}$} non-degenerate, it holds that $|\cap_{\tau=1}^{t'} H_\tau| \neq 0$ mod m. (Definition 5).
Next consider Proposition 1: Let l≥2 an integer, and $$m = \prod_{i=1}^{r} p_i^{\alpha_i}$$

be a positive integer with r>1 different prime divisors such that ∀i∈{1, . . . , r}: $p_i$>l. Suppose that there exists an integer t≥2 and a uniform set-system $\mathcal{G}$ satisfying the conditions:
1. ∀G∈$\mathcal{G}$ :|G|=0 mod m
2. ∀t' such that 2≤t'≤t, and for all distinct $G_1$, $G_2$, . . . , $G_{t'}$∈ $\mathcal{G}$ it holds that $|\cap_{\tau=1}^{t'} G_\tau| = \mu$ mod m, where μ≠0 mod m and ∀i∈{1, . . . , r}: μ∈{0, 1} mod $p_i$
3. $|\cap_{G \in \mathcal{G}} G| \neq 0$ mod m
Then there exists a set-system $\mathcal{H}$ that is explicitly constructible from the set-system $\mathcal{G}$ such that 1.) ∀$H_1$, $H_2$ ∀ $\mathcal{H}$, either $|H_1|=|H_2|$, $|H_1|=l|H_2|$, or $l|H_1|=|H_2|$, and 2.) $\mathcal{H}$ has t-wise restricted intersections modulo m. (See Definition 5).

Based on Proposition 1, Remark 1 is stated, which will be used later to further describe reconstruction according to operation 210. Suppose that |f|=s and that the number of elements in the universe of $\mathcal{G}$ is g. Then, there are ls sets of size km and $s^l$ sets of size lkm in $\mathcal{H}$. Therefore, $|\mathcal{H}| = s^l + ls$. The universe of $\mathcal{H}$ has lg elements and for each H∈

$\mathcal{H}$ exactly one of the following is true: H is a proper subset of exactly $s^{l-1}$ sets and not a proper superset of any sets in $\mathcal{H}$, or H is a proper superset of exactly 1 sets and not a proper subset of any sets in $\mathcal{H}$.

A non-uniform (in other words, member sets do not all have equal size) set-system $\mathcal{H}$ can be defined according to Corollary 2:

Let $\{a_i\}_{i=1}^r$ be r>1 positive integers and $$m = \prod_{i=1}^{r} p_i^{\alpha_i}$$

be a positive integer with r different odd prime divisors: $p_1, \ldots, p_r$, and $l \geq 2$ be an integer such that $l < \min(p_1, \ldots, p_r)$. Then, there exists c>0 such that for all integers $t \geq 2$ and $h \geq lm$, there exists an explicitly constructible non-uniform (i.e., member sets do not have equal size) set-system $\mathcal{H}$, defined over a universe of h elements, such that $$|\mathcal{H}| > \exp\left(\frac{l(\log h)^r}{(\log \log h)^{r-1}}\right) + l\exp\left(\frac{l(\log h)^r}{(\log \log h)^{r-1}}\right)$$

$\forall H \in \mathcal{H}$ $|H| = 0$ mod m
$\forall H_1, H_2 \in \mathcal{H}$, either $|H_1|=|H_2|$, $|H_1|=l|H_2|$ or $l|H_1|=|H_2|$
$\forall H_1, H_2 \in \mathcal{H}$, where $H_1 \neq H_2$: if $H_2 \subset H_1$ or $H_1 \subset H_2$ then $|H_1 \cap H_2| = 0$ mod m, else $|H_1 \cap H_2| \neq 0$ mod m
$\mathcal{H}$ has t-wise restricted intersections modulo m Corollary 2 Non-Uniform Set-System Definition In other words, the set-system $\mathcal{H}$ is defined with subsets $H_1$ and $H_2$ such that if $H_1$ is a subset of $H_2$ or vice versa, then the intersection of $H_1$ and $H_2$ includes a multiple of m members. Otherwise, the size of their intersection is not a multiple of m.

For the set-system $\mathcal{H}$ defined in Corollary 2, if each set $H_i \in \mathcal{H}$ is represented by a unique vector $v_i \in (Z_m)^h$, then for a set S of size m-1, the set of vectors $\mathcal{V} = v_{i_{i=1}}^N$, formed by the representative vectors of all sets in $\mathcal{H}$, forms an S-covering family such that $$N > \exp\left(c\frac{(\log h)^r}{(\log \log h)^{r-1}}\right) + l\exp\left(c\frac{l(\log h)^r}{(\log \log h)^{r-1}}\right) \forall i,$$

$j \in [N]$ it holds that $<v_i, v_j> = |H_i \cap H_j|$ mod m.

Corollary 3—Further Definition of Covering Vectors

Next, decomposable covering vectors are described and defined. These decomposable covering vectors are like the above-described covering vector families, except that uniform (rather than non-uniform) set-systems are used to define matching vector families. These decomposable covering vectors will be used in subsequent operations to develop decomposable query generation algorithms.

First, let $$m = \prod_{i=1}^{r} p_i^{\alpha_i}$$

be a positive integer with r odd prime divisors. Let $\wp$ and I be two disjoint universes, containing h elements each. In accordance with Corollary 2, two set-systems can be defined with the following two parameters:
1. $\mathcal{H}$ modulo m over the universe $\wp$ such that $\forall H_1, H_2 \in \mathcal{H}$, either $|H_1|=|H_2|$, $|H_1|=l|H_2|$ or $l|H_1|=|H_2|$.
2. $\mathcal{H}$ ' modulo m, over the universe I such that $\forall H_1, H_2 \in \mathcal{H}$, either $|H_1|=|H_2|$, $|H_1|=l|H_2|$ or $l|H_1|=|H_2|$ It is known from Corollary 1 that a covering vectors family $\mathcal{V} \in Z_m^h$ follows directly from $\mathcal{H}$. Each vector $v \in \mathcal{V}$ is prepended with h leading zeroes, in other words, $0^h \| v$. Similarly, the vectors u in the covering vectors family $\mathcal{U} \in Z_m^h$, that follows from $\mathcal{H}$ ', are updated as $v \| 0^h$. Hereinafter, $\mathcal{U}$ and $\mathcal{V}$ shall denote the updated covering vectors family.

From Corollary 2, the size of the superset-subset intersections in $\mathcal{H}$ and $\mathcal{H}$ ' is mk for a positive integer k. By defining a set-system $\mathcal{H}$ * as the collection of all sets formed as $H_i \cup H'_j$, where $H_i \in \mathcal{H}$, $H'_j \in \mathcal{H}$ ', for all i, $j \in [|\mathcal{H}|]$, it can be verified that the resulting family of sets $\mathcal{H}$ * satisfies the following:

$|\mathcal{H}| = |\mathcal{H}|^2$
$\forall H \in \mathcal{H}$ *: $|H| = 0$ mod 2m
$\forall H_1, H_2 \in \mathcal{H}$ *, where $H_1 \neq H_2$: if $H_2 \subset H_1$ or $H_1 \subset H_2$, then $|H_1 \cap H_2| = m(k+k')$, else $|H_1 \cap H_2| \neq m(k+k')$.

Observe that the family of vectors $\mathcal{V} \in z_{2m}^{2h}$ formed by the vectors $v_i + u_j \in z_{2m}^{2h}$, where i, $j \in [|\mathcal{H}|]$ and $v_i \in \mathcal{V}$, $u_j \in \mathcal{U}$ represents the sets in $\mathcal{H}$ *. That is, $v_i + u_j \in z_{2m}^{2h}$ forms a decomposable covering vectors family (Definition 6) representing $\mathcal{H}$ * with $\mathcal{V}$ and $\mathcal{U}$ being its decompositions.

Having provided the mathematical background regarding the covering vector generated in operation 202, referring back to the description of method 200, the processor 402 generates the covering vector according to Definition 6. This covering vector corresponds to the database entries whose aggregate the user wants to retrieve.

The method 200 continues with operation 204 with the processor generating database queries based on the covering vector produced according to operation 202 above. The processor 402 can perform this operation by executing a query generation algorithm. The processor 402 can generate a decomposable query generation algorithm that has been decomposed into t query generation algorithms, wherein t corresponds to a count of the plurality of servers. For example, referring again to FIG. 1, there are three database servers 106a, 106b, and 106c, and therefore t=3 for purposes of decomposing the query generation algorithm in this example. The processor 402 can randomize the t query generation algorithms based on a set of randomization parameters. Each randomization parameter of the set of randomization parameters may comprise a vector. The set of randomization parameters may be private to a computer system (e.g., client computer 102) executing the t query generation algorithms.

Let the covering vector (see Definition 2) corresponding to the client computer 102 inputs be $(u_{x_1}^{(1)}, u_{x_2}^{(2)}) \in Z_m^h \times Z_m^h$. Let the client computer 102 randomness be $r=(r_1, r_2)$ where $r_1, r_2$ are interpreted as vectors in $Z_m^h$. Then, given an example three servers that can store the database to be queried, the processor 402 generates the decomposable query generation algorithms according to:

Query generation algorithm $\mathcal{Q}_1$ (3, r, $x_1$) outputs $q_1 = (u_{x_1}^{(1)} - r_1, r_1 + r_2)$
Query generation algorithm $\mathcal{Q}_2$ (3, r, $x_2$) outputs $q_2 = (r_1 + r_2, u_{x_2}^{(2)} - r_2)$ Query generation algorithm $Q_3^1$ (3, r, $x_1$) outputs $q_3^1 = u_{x_1}^{(1)} - r_1$ Query generation algorithm $Q_3^2$ (3, r, $x_2$) outputs $q_3^2 = u_{x_2}^{(2)} - r_2$, in other words algorithm $Q(3, r, x)$ outputs $(u_{x_1}^{(1)} - r_1, u_{x_2}^{(2)} - fr_2)$ Once the queries have been generated, the method 200 can continue with operation 206 with the client computer 102 transmitting the database queries to the plurality of database servers, 106a, 106b, and 106c. The client system can use any wired or wireless networking and communication circuitry described with reference to FIG. 4, for example, wireless network transceiver 410, network interface controller (NIC) 414, etc., to perform operation 206.

The method 200 can continue with operation 208 with the client computer 102 receiving, responsive to transmitting the database queries, a plurality of shares from the plurality of database servers, 106a, 106b, and 106c. Shares are described in the description below of secret sharing and share conversion theory. The database servers 106a, 106b, and 106c can provide these shares using an answering algorithm. In some example embodiments, the answering algorithms will include PIR protocol-based answering algorithms, summarized below. The example below is given for three servers, although any number of servers that store copies of the queried database can perform answering algorithms.

First, secret sharing and share conversion theory is provided to aid in the explanation of sharing according to embodiments. Secret sharing provides a means to distribute shares of a secret so that any authorized subset of participants may reconstruct the secret. In the field of computer science, such a secret may comprise data in a memory device of a computing system comprising one or more computing devices. Shares of the secret may be created. The shares of the secret may correspond to share data that can be provided to a plurality of computing devices. In one example of a secret sharing scheme, a threshold is established corresponding to a given number of participants who must participate in a request to reconstruct the secret to successfully achieve secret reconstruction. In such a scheme, a total number of parties (n) are provided shares such that a threshold (t) number of parties must be participants in secret reconstruction to be successful. This is often referred to as the threshold case or a (t, n)-threshold scheme. In the traditional (t, n)-threshold scheme, the authorized subset of participates required to reconstruct the secret is defined by a publicly known access structure. That is, all participants know that so long as a threshold (t) or greater number of participants provide shares, the secret can be reconstructed.

In view of the foregoing, the following discussion relates to mathematical concepts that enable the servers to provide shares according to operation 208. Specifically, a system may have a plurality of parties defined as $\mathcal{P} = \{P_1, \ldots, P_\ell\}$. An access structure is defined as $\Gamma \subseteq 2^\mathcal{P}$, which is a monotone collection of non-empty subsets of the set of parties ($\mathcal{P}$). A collection $\Gamma \subseteq 2^\mathcal{P}$ is monotone if $\mathcal{A} \in \Gamma$ and $\mathcal{A} \subseteq \mathcal{B}$ imply that $\mathcal{B} \in \Gamma$. Sets in $\Gamma$ are called authorized and sets not in $\Gamma$ are called not authorized. If $\Gamma$ consists of all subsets of $\mathcal{P}$ with size greater than or equal to a fixed threshold $t (1 \le t \le \ell)$, then $\Gamma$ is called a t-threshold access structure. For an access structure $\Gamma$, a family of minimal authorized subsets $\Gamma_0 \in \Gamma$ is defined as:

$\Gamma_0 = \{\in \Gamma : \mathcal{B}$ is not a subset of $\mathcal{A}$ for all $\mathcal{B} \in \Gamma \setminus \{\mathcal{A}\}\}$ A computational secret sharing scheme may comprise of a pair of polynomial-time algorithms that are provided with respect to an access structure (F), a security parameter ($\omega$), a set of $\ell$ polynomial-time parties $\mathcal{P} = \{P_1, \ldots, P_\ell\}$, and a set of secrets ($\mathcal{K}$). Polynomial-time algorithms are utilized in contrast to exponential algorithms to provide computational efficiency to the secret sharing scheme. In this regard, the secret sharing scheme may be conditionally secure against classical and quantum computing resources.

The polynomial-time algorithms may include a share generation algorithm and a secret reconstruction algorithm. The share generation algorithm is a randomized algorithm that gets a secret that is an element of the secret set ($k \in \mathcal{K}$) and access structure $\Gamma$ as inputs and outputs a share for each of the parties. That is, the share generation algorithm outputs a number of shares equal to the number of parties. The shares may be defined as $(\Pi_1^{(k)}, \ldots, \Pi_\ell^{(k)})$. In turn, each share can be provided to a party in the secret sharing scheme such that the access structure is encoded in the share by the share generation algorithm.

The secret reconstruction algorithm is a deterministic algorithm that gets as inputs the shares of a participating subset of the parties and outputs a string in the secret set. That is, the participating subset may be defined as $\mathcal{A} \subseteq \mathcal{P}$ denoted by $$\left\{\Pi_i^{(k)}\right\}_{i \in \mathcal{A}}.$$

In relation to the share generation algorithm and the secret reconstruction algorithm, the algorithms may provide perfect correctness and computational secrecy. In relation to perfect correctness, for all secrets that are an element of the secret set and every authorized subset in the access structure, the output of the secret reconstruction algorithm is the secret (for all $k \in \mathcal{K}$ and every authorized subset $\mathcal{A} \in \Gamma$, it holds that $$Pr\left[Recon\left(\{\Pi_i^{(k)}\}_{i \in \mathcal{A}}, \mathcal{A}\right) = k\right] = 1].$$

In relation to computational secrecy, for each subset that is not authorized and for any different secrets from the secret set, the distributions of the shares for parties from the unauthorized set are computationally indistinguishable (for every subset $\mathcal{B} \notin \Gamma$ and all different secrets $k_1, k_2 \in \mathcal{K}$, it holds that the distributions $$\{\Pi_i^{(k_1)}\}_{i \in \mathcal{B}}$$

and $$\{\Pi_i^{(k_2)}\}_{i \in \mathcal{B}}$$

are computationally indistinguishable with respect to $\omega$). If $\forall k_1, k_2 \in \mathcal{K}$ with $k_1 \ne k_2$, the distributions $$\{\prod_i^{(k_1)}\}_{i \in \mathcal{B}}$$

and $$\{\prod_i^{(k_2)}\}_{i \in \mathcal{B}}$$

are identical, then the scheme is called a perfect sharing scheme.

Share conversion schemes can be applied in a PIR (or APIR) environment. Let $\mathcal{L}$ and $\mathcal{L}'$ be two secret-sharing schemes over the domains of sets of secrets $K_1$ and $K_2$, respectively and let $C \subseteq K_1 \times K_2$ be a relation such that, for every $a \in K_1$ there exists at least one $b \in K_2$ such that $(a, b) \in C$. $\mathcal{L}$ can be said to be "locally-convertible" to $\mathcal{L}'$ with respect to C if there exist local conversion functions $g_1, \ldots, g_t$ such that if $s_1, \ldots s_t$ is a valid sharing for some secret s in $\mathcal{L}$, then $g_1(s_1), \ldots, g_t(s_t)$ is a valid sharing for some secret s' in $\mathcal{L}'$ such that $(s, s') \in C$.

A modified universal relation is now defined for use in further definition of a share conversion from (2, 3)-Conjunctive Normal form (CNF) over $Z_m$ to additive sharing over $Z_p^\beta$. Let G and G' be finite Abelian groups and let $S \subseteq G \setminus \{0\}$. The relation $C_S$ converts $s = 0 \in G$ to any nonzero $s' \in G$ and every $s \in S$ to $s' = 0$. There is no requirement when $s \notin S \cup \{0\}$. Formally, this gives Definition 7:

$C_S = \{(s,0):s \in S\} \cup \{(0,s'):s' \in G' \setminus \{0\}\} \cup \{(s,s'):s \notin S \cup \{0\}, s' \in G'\}$ Next, we define a canonical set $S_m$. Let m be a product of distinct primes. The canonical set $S_m$ contains all integers $1 \leq i < m$ that are either 0 or 1 modulo each prime divisor of m. This allows a statement of Theorem 2:

Assume there exists a share conversion scheme from (2, 3)-CNF over $G_1 = Z_m$. And 3-additive over $G_2 = Z_p^\beta$ for some β, where $m = p_1 p_2$. Then there exists a 3-server PIR with communication complexity $O(2^{2p_2}\sqrt{n \log n})$, where $p_2 > p_1$.

Theorem 2—PIR Communication Complexity

The best asymptotic communication complexity is obtained by setting m=6, p=2 using Corollary 1 provided earlier herein, over $G_1^h$ over $Z_6$ with $h = 2^{O(\sqrt{n})}$ and a share conversion with respect to $C_{S_m}$ for $p_1 = p = \beta = 2$, $p_2 = 3$. In particular, a share conversion is shown to exists according to Theorem 3:

Let $p_1$, $p_2$ be distinct odd primes. Then for the relation $C_{S_{p_1 p_2}}$, a share conversion from (2, 3)-CNF over $Z_{p_1 p_2}$ to 3-additive over $Z_{p_1}^\beta$ exists for some β>0.

Theorem 3—Existence of Share Conversion

Having provided the theory that share conversion exists, and that PIR communication complexity is reduced in example embodiments, a canonical set $T_m$ may be defined. Let m be a product of distinct primes. The canonical set $T_m$ contains all integers $1 \leq i < m$ that are 0, 1, 2 or 3 module each prime divisor of m. Assume that m is a product of two odd primes $p_1$, $p_2$. This gives Definition 8 (which is similar to Definition 7): $C_{T_m} = \{(t, 0):t \in T_m\} \cup \{(0, t'):t' \in G' \setminus \{0\}\} \cup \{(t, t'):t \notin T_m \cup \{0\}, t' \in G'\}$ Then, with respect to relation $C_{T_m}$, a share conversion from (2, 3)-CNF over $Z_m$ to 3-additive sharing over $Z_{p_1}^\beta$ exists for some β>0. (Assumption 1)

Observe that the decomposable matching vector $(u_{x_1}^{(1)} + u_{x_2}^{(2)})$ is effectively 3-CNF shared among the three servers by the decomposable query generation algorithm. This can be more easily seen by examining $u'_2 = u_{x_1}^{(1)} - r_1$, $u_{x_2}^{(2)} - r_2$ and $u'_3 = r_1 + r_2$. Then, $\{u'_2, u'_3\}$ can be derived from $q_1$ and $\{u'_2, u'_3\}, \{u'_3, u'_1\}, \{u'_1, u'_2\}$ is a 3-party CNF sharing of $u_{x_1}^{(1)} + u_{x_2}^{(2)}$.

Each server $S_j (j \in [3])$ can perform the following operations, which may be similar to the 3-server PIR protocols (particularly the decomposable APIR) described earlier herein. First, $S_j$ derives $\{u'_{j-1}, u'_{j+1}\}$ from $q_j$. Then, $S_j$ computes $a_{j, j-1, l} = <u'_{j-1}, v_l>$ and $a_{j, j+1, l} = <u'_{j+1}, v_l>$ for each $l \in [N] \times [N]$. Next, $S_j$ applies the share conversion procedure corresponding to share conversion from 3-party CNF sharing to additive sharing over $Z_p^\beta$ to each CNF share $\{a_{j, j-1, l}, a_{j, j+1, l}\} \in Z_m^2$ to obtain $a'_{j, l} \in Z_p^\beta$. Finally, $S_j$ sends $\Sigma_{l \in [N] \times [N]} y_l a'_{j, l}$ (Summation 1) to the client, where $y_l \in \{0, 1\}$ denotes the l-th element of the database and is interpreted as an element in $Z_p^\beta$.

The method 200 can continue with operation 210 with the processor 402 reconstructing an aggregate of database entries using a reconstruction algorithm. The reconstruction algorithm can take as input the plurality of shares from the plurality of servers that were received in operation 208. In some embodiments, the aggregation of database entries comprises a summation of database entries, while in other embodiments, the aggregation of database entries comprises a logical OR of the database entries. A decomposable reconstruction algorithm executes as follows. Let $\mathcal{R}'((x_1, x_2), r, (a_1, a_2))$ be an algorithm that computes $a_1 + a_2$, where addition is over $Z_p^\beta$. Let $\mathcal{R}''(c_1, c_2)$ be an algorithm that outputs 0 if $c_1 + c_2 = 0 \in Z_p^\beta$ and outputs 1 otherwise. The client computer 102 obtains answers $a_1, a_2, a_3$ from servers $S_1, S_2, S_3$ and computes $a = a_3 + \mathcal{R}'((x_1, x_2), a_1, a_2) = a_1 + a_2 + a_3 \in Z_p^\beta$ and outputs $z = \mathcal{R}''(a)$.

The construction according to operation 210 always produces the correct value, based on the theorems and corollaries provided above. For example, by the definition of $C_{T_m}$ (given with respect to Definition 8 above), only the conversion of $<u_i, v> = 0 \in Z_p^\beta$ contributes a non-zero value in Summation 1 above, in other words, the summation of $y_i$'s $(i \in [l])$. Because the vector family is a matching vectors family, only inner products where $<u_i, v> = 0 \in Z_p^\beta$ corresponds precisely to the entries whose aggregate the user wants to retrieve. It follows from Assumption 1 that by simply replacing matching vectors with our decomposable covering vectors in method 200, a decomposable aggregate PIR can be created that computes the logical OR of all bits $y_i$ where $<u_i, v> = 0 \in Z_p^\beta$ which is $s^{l-1} + 1$ for all $i \in [N]$ according to Remark 1 above.

Figure 3:
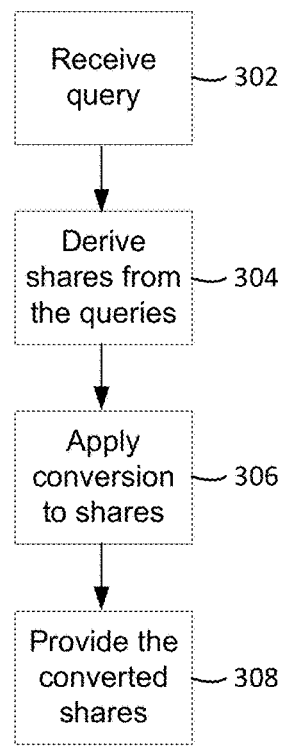
FIG. 3 is a flowchart illustrating an example method for private information sharing in accordance with example embodiments.

FIG. 3 is a flowchart illustrating an example method 300 for private information sharing in accordance with example embodiments. Some operations of method 300 can be implemented by database servers 106a, 106b, 106c (FIG. 1) or by components of one of the database servers 106a, 106b, 106c, for example by processor 402 (FIG. 4) executing or performing computer instructions 422, etc. The method can include operations of the decomposable APIR although embodiments are not limited thereto. Some operations of method 300 can proceed according to the theorems described above with respect to method 200.

Example method 300 can begin with operation 302 with the processor 402 receiving query $q_j$ for information from a database stored on the database server 106a. The method 300 can continue with operation 304 with the processor 402 deriving shares $\{u'_{j-1}, u'_{j+1}\}$ from queries $q_j$. The method 300 can continue with operation 306 with the database server 106a applying a share conversion procedure to compute shares as described above with reference to operation 208. Finally, in operation 308, the database server 106a will transmit converted share/s to the querying computing device, responsive to the queries.

Figure 4:
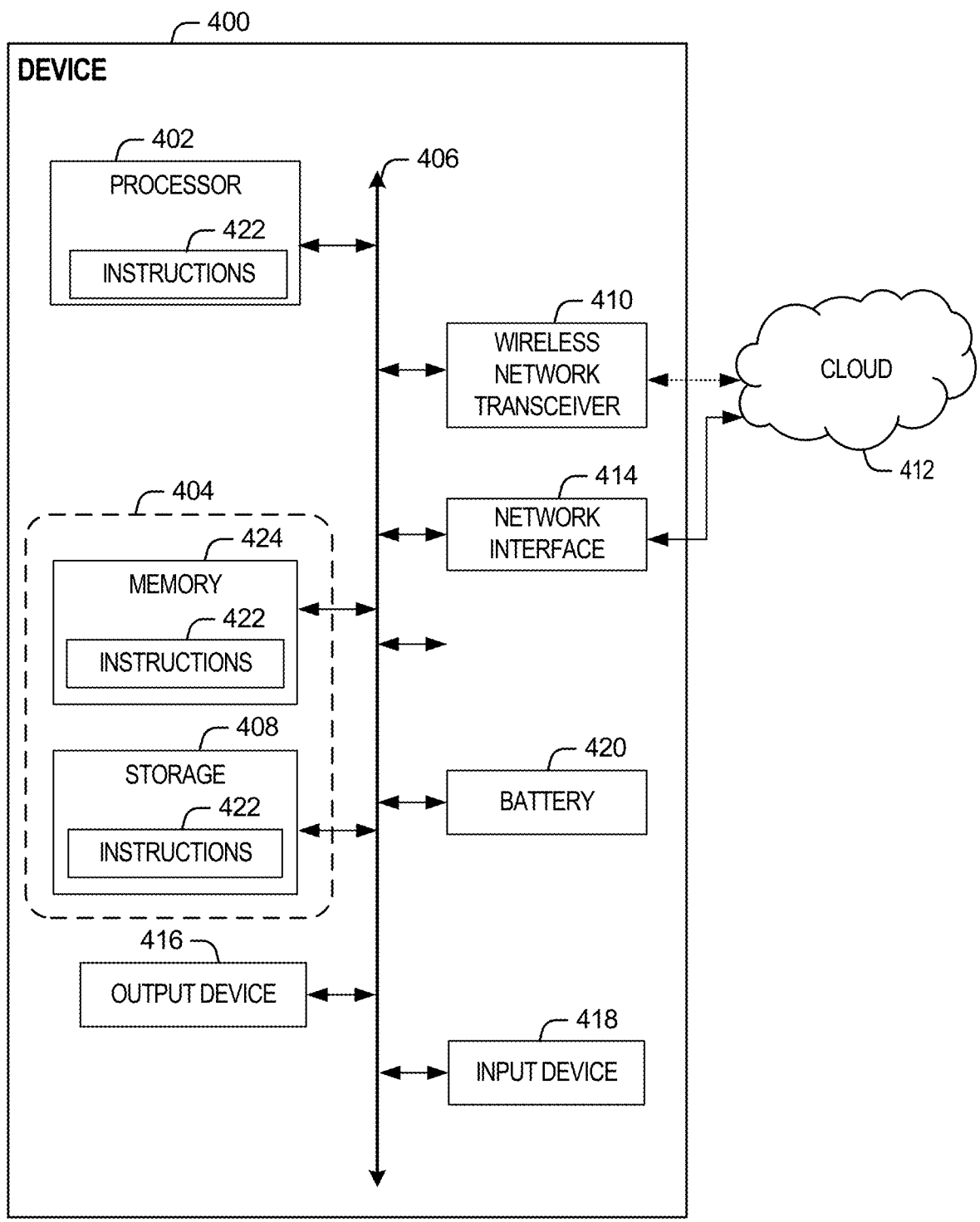
FIG. 4 illustrates an example of a computing device capable of providing functionality associated with example embodiments.

As described above, private information retrieval as described herein may be used by a plurality of computing devices for computational secret sharing of a secret comprising data in a memory device. FIG. 4 illustrates an example schematic of a computing device 400 suitable for implementing aspects of the disclosed technology including any of the foregoing user computers 102 or database servers 106a, 106b, 106c discussed above. FIG. 4 provides closer view of the respective components of device 400 when implemented as or as part of a computing device (e.g., as a mobile device, a base station, server, gateway, etc.). The device 400 may include any combinations of the hardware or logical components referenced herein, and it may include or couple with any device usable with a communication network or a combination of networks. The components may be implemented as integrated circuits (ICs), portions thereof, discrete electronic devices, or other modules, instruction sets, programmable logic or algorithms, hardware, hardware accelerators, software, firmware, or a combination thereof adapted in the device 400 or as components otherwise incorporated within a chassis of a larger system.

The device 400 may include processing circuitry in the form of a processor 402, which may be a microprocessor, a multi-core processor, a multithreaded processor, an ultra-low voltage processor, an embedded processor, or other known processing elements. The processor 402 may be a part of a system on a chip (SoC) in which the processor 402 and other components are formed into a single integrated circuit, or a single package.

The processor 402 may communicate with a system memory 424 over an interconnect 406 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a machine-readable medium 408 may also couple to the processor 402 via the interconnect 406. In an example, the machine-readable medium 408 may be implemented via a solid-state disk drive (SSDD). Other devices that may be used for the machine-readable medium 408 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the machine-readable medium 408 may be on-die memory or registers associated with the processor 402. However, in some examples, the machine-readable medium 408 may be implemented using a micro hard disk drive (HDD). Further, any number of new technologies may be used for the machine-readable medium 408 in addition to, or instead of, the technologies described, such resistance change memories, phase change memories, holographic memories, or chemical memories, among others.

The components may communicate over the interconnect 406. The interconnect 406 may include any number of technologies, including industry standard architecture (ISA), extended ISA (EISA), peripheral component interconnect (PCI), peripheral component interconnect extended (PCIx), PCI express (PCIe), or any number of other technologies. The interconnect 406 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 406 may couple the processor 402 to the wireless network transceiver 410, for communications with the connected devices. The wireless network transceiver 410 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 410 (or multiple transceivers) may communicate using multiple standards or radios for communications at a different range. For example, the device 400 may communicate with close devices, e.g., within about 10 meters, using a local transceiver based on Bluetooth Low Energy (BLE), or another low power radio, to save power. More distant connected devices, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

The wireless network transceiver 410 (e.g., a radio transceiver) may be included to communicate with devices or services in the cloud 412 via local or wide area network protocols. The wireless network transceiver 410 may be a low-power wide-area (LPWA) transceiver that follows the IEEE 802.15.4, or IEEE 802.15.4g standards, among others. The device 400 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

The NIC 414 may be included to provide a wired communication to other devices. The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others.

Given the variety of types of applicable communications from the device to another component or network, applicable communications circuitry used by the device may include or be embodied by any one or more of components 410 or 414. Accordingly, in various examples, applicable means for communicating (e.g., receiving, transmitting, etc.) may be embodied by such communications circuitry.

In some optional examples, various input/output (I/O) devices may be present within or connected to, the device 400. For example, a display or other output device 416 may be included to show information, such as information regarding data received as a result of queries according to methods above. An input device 418, such as a touch screen or keypad may be included to accept input. An output device 416 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the device 400. A display or console hardware, in the context of the present system, may be used to provide output and receive input; to manage components or services; identify a state the device 400 or of a service; or to conduct any other number of management or administration functions or service use cases.

A battery 420 may power the device 400, although, in examples in which the device 400 is mounted in a fixed location, it may have a power supply coupled to an electrical grid, or the battery may be used as a backup or for temporary capabilities. The battery 420 may be a lithium ion battery, or a metal-air battery, such as a zinc-air battery, an aluminum-air battery, a lithium-air battery, and the like.

The storage 404 may include instructions 422 in the form of software, firmware, or hardware commands to implement the techniques described herein. Although such instructions 422 are shown as code blocks included in the memory 424 and the storage 404, it may be understood that any of the code blocks may be replaced with hardwired circuits, for example, built into an application specific integrated circuit (ASIC).

In an example, the instructions 422 provided via the memory 424, the storage 404, or the processor 402 may be embodied as a non-transitory, machine-readable medium 408 including code to direct the processor 402 to perform electronic operations in the device 400. The processor 402 may access the non-transitory, machine-readable medium 408 over the interconnect 406. For instance, the non-transitory, machine-readable medium 408 may be embodied by devices described for the storage 404 or may include specific storage units such as optical disks, flash drives, or any number of other hardware devices. The non-transitory, machine-readable medium 408 may include instructions to direct the processor 402 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of privately retrieving database entries from a database, the method comprising:
   providing a covering vector for a plurality of database entries of the database, wherein the covering vector is defined such that an inner product of the covering vector is zero with more than one member of a covering vector family that includes the covering vector;
   generating database queries based on the covering vector;
   transmitting the database queries to a plurality of servers;
   responsive to transmitting the database queries, receiving a plurality of shares: from the plurality of servers; and
   obtaining an aggregation of database entries based on the plurality of shares.

2. The method of claim 1, wherein generating database queries includes executing a query generation algorithm, and wherein the method comprises: decomposing the query generation algorithm into t query generation algorithms, wherein t corresponds to a count of the plurality of servers.

3. The method of claim 2, further comprising: randomizing the t query generation algorithms based on a set of randomization parameters.

4. The method of claim 3, wherein each randomization parameter of the set of randomization parameters comprises a vector.

5. The method of claim 3, wherein the set of randomization parameters is private to a computer system executing the t query generation algorithms.

6. The method of claim 5, wherein shares of the plurality of shares do not include information identifying the computer system executing the t query generation algorithms.

7. The method of claim 1, further comprising: reconstructing an aggregate of database entries using a reconstruction algorithm, wherein the reconstruction algorithm takes as input the plurality of shares from the plurality of servers.

8. The method of claim 1, wherein the aggregation of database entries comprises a summation of database entries.

9. The method of claim 1, wherein the aggregation of database entries comprises a logical OR of the database entries.

10. An apparatus for privately retrieving database entries from a database, the apparatus comprising: a network interface; and a computing apparatus comprising processing circuitry coupled to the network interface and configured to:
    provide a covering vector for a plurality of database entries of the database, wherein the covering vector is defined such that an inner product of the covering vector is zero with more than one member of a covering vector family that includes the covering vector;
    generate database queries based on the covering vector;
    transmit the database queries to a plurality of servers over the network interface;
    responsive to transmitting the database queries, receive a plurality of shares from the plurality of servers; and
    obtain an aggregation of database entries based on the plurality of shares.

11. The apparatus of claim 10, wherein the processing circuitry is further configured to: execute a query generation algorithm to generate the database queries; and decompose the query generation algorithm into t query generation algorithms, wherein t corresponds to a count of the plurality of servers.

12. The apparatus of claim 11, wherein the processing circuitry is further configured to: randomize the t query generation algorithms based on a set of randomization parameters.

13. The apparatus of claim 12, wherein each randomization parameter of the set of randomization parameters comprises a vector.

14. The apparatus of claim 12, wherein the set of randomization parameters is private to a computer system executing the t query generation algorithms.

15. The apparatus of claim 14, wherein shares of the plurality of shares do not include information identifying the processing circuitry that executes the t query generation algorithms.

16. The apparatus of claim 10, wherein the processing circuitry is further configured to: reconstruct an aggregate of database entries using a reconstruction algorithm, wherein the reconstruction algorithm takes as input the plurality of shares from the plurality of servers, and wherein the aggregation of database entries comprises a summation of the database entries or a logical OR of the database entries.

17. One or more non-transitory tangible processor-readable storage media embodied with instructions for executing on one or more processors and circuits of a device a process for private information retrieval, the instructions directing the one or more processors to perform one or more operations comprising:
    providing a covering vector for a plurality of database entries of a database, wherein a covering vector is defined such that an inner product of the covering vector is zero with more than one member of a covering vector family that includes the covering vector;
    generating database queries based on the covering vector;
    transmitting the database queries to a plurality of servers, the plurality of servers each including a copy of the database;
    responsive to transmitting the database queries, receiving a plurality of shares from the plurality of servers; and obtaining an aggregation of database entries based on the plurality of shares.

18. The non-transitory tangible processor-readable storage media of claim 17, wherein generating database queries includes executing a query generation algorithm, and wherein the operations include: decomposing the query generation algorithm into t query generation algorithms, wherein t corresponds to a count of the plurality of servers; and randomizing the t query generation algorithms based on a set of randomization parameters.

19. The non-transitory tangible processor-readable storage media of claim 18, wherein each randomization parameter of the set of randomization parameters comprises a vector, and wherein the set of randomization parameters is private to a computer system executing the t query generation algorithms.

20. The non-transitory tangible processor-readable storage media of claim 17, wherein the operations include: reconstructing an aggregate of database entries using a reconstruction algorithm, wherein the reconstruction algorithm takes as input the plurality of shares from the plurality of servers, wherein the aggregation of database entries comprises a summation of database entries or a logical OR of the database entries.

\* \* \* \* \*